(12) United States Patent
Brenn

(10) Patent No.: US 6,369,362 B1
(45) Date of Patent: Apr. 9, 2002

(54) SINGLE AND DOUBLE SIDED VENTLESS HUMIDITY CABINET

(76) Inventor: Eric Walter Brenn, 40 Raven La., Aliso Viejo, CA (US) 92656

( * ) Notice: Subject to any disclaimer, the term of this patent is extended or adjusted under 35 U.S.C. 154(b) by 0 days.

(21) Appl. No.: 09/680,747

(22) Filed: Oct. 6, 2000

Related U.S. Application Data

(60) Provisional application No. 60/186,528, filed on Mar. 2, 2000.

(51) Int. Cl.$^7$ ................................................ A47J 36/24
(52) U.S. Cl. ........................ 219/401; 219/400; 312/236
(58) Field of Search ................................. 219/391, 396, 219/399, 400, 401, 413; 99/474, 483; 312/236; 126/20, 20.1, 20.2; 165/918; 432/64

(56) References Cited

U.S. PATENT DOCUMENTS

| | | | |
|---|---|---|---|
| 3,926,106 A | 12/1975 | Deusing et al. | |
| 3,942,426 A | * 3/1976 | Binks et al. | 219/400 |
| 3,952,609 A | 4/1976 | Klemm | |
| 3,962,962 A | 6/1976 | Anderson | |
| 3,999,475 A | 12/1976 | Roderick | |
| 4,010,349 A | 3/1977 | Lee | |
| 4,011,805 A | 3/1977 | Vegh | |
| 4,038,968 A | * 8/1977 | Rovell | 219/400 |
| 4,052,589 A | 10/1977 | Wyatt | |
| 4,062,983 A | 12/1977 | Roderick | |
| 4,074,108 A | 2/1978 | King | |
| 4,244,979 A | 1/1981 | Roderick | |
| 4,343,985 A | 8/1982 | Wilson et al. | |
| 4,373,430 A | 2/1983 | Allen | |
| 4,381,442 A | * 4/1983 | Guibert | 219/400 |
| 4,426,923 A | * 1/1984 | Ohata | 99/474 |
| 4,455,478 A | * 6/1984 | Guibert | 219/400 |
| 4,722,268 A | * 2/1988 | Rightley | 219/401 |
| 5,132,520 A | * 7/1992 | Blanton et al. | 219/400 |
| 5,309,981 A | * 5/1994 | Binder | 219/400 |
| 5,532,456 A | 7/1996 | Smith et al. | |

FOREIGN PATENT DOCUMENTS

JP 9-119643 * 5/1997

* cited by examiner

Primary Examiner—Joseph Pelham
(74) Attorney, Agent, or Firm—Curtis L. Harrington

(57) ABSTRACT

A ventless humidity cabinet system with entry window includes operating elements for providing an evenly heated humid air supply to products, such as food products, and utilizes any combination of air curtain fans, water tanks, inlet water lines, water inlet valves, wet heating elements, dry heating elements, water temperature probes, air temperature probes, air humidity probes, water level sensors, lower drain valves and a control computer.

12 Claims, 1 Drawing Sheet

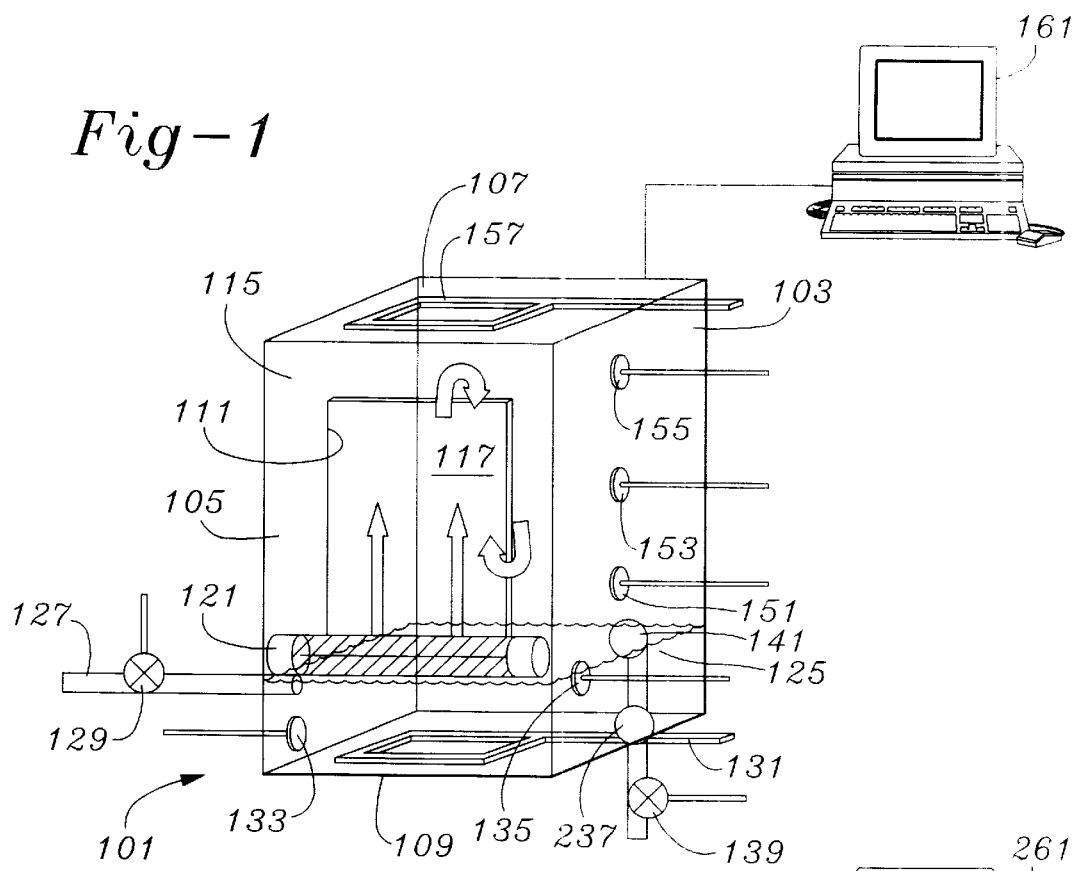

SINGLE AND DOUBLE SIDED VENTLESS HUMIDITY CABINET

This application is based upon a co-pending provisional patent application No. 60/186,528 filed on Mar. 2, 2000.

FIELD OF THE INVENTION

This invention relates generally to equipment, thermal equipment and more particularly to high efficiency equipment for controlling heat and humidity as well as to take advantage of the heat capacity, density and flow of humid air. The structural embodiment of the invention is an improved single and double sided doorless humidity cabinet.

BACKGROUND OF THE INVENTION

Thermal equipment, particularly thermal equipment in use in the food industry, will ideally require as precise a thermal and humidity control as possible. Because of the required ease of transport of food, most such equipment must have high user access, typically a rack of trays for quick removal for use in loading, bringing to temperature and maintaining temperature. Tray loading and storage usually requires a wide opening such as a door which provides a continual stream of upset to the internal environment. A unit of equipment needs to have the ability to adjust from a condition of intermittent and continual usage. The food items recently added should come to a good temperature and humidity condition quickly.

Complicating this goal is the physics associated with the inside of the unit of equipment. Where hot air sources and heating elements are present, there is a danger that the dry heat will harden the food, and that the moist heat will condense on the food to make the food soggy. These are the extreme limits of wrong operation. More common are the closer limits of wrong operation in that food on horizontal racks for example, in the upper reaches overheats and dries out, whereas food on the lower reaches experiences condensation and is too cool.

Physical and scientific limitations on a common space for environmental control are not only difficult to maintain, but monitoring in order that control may be effected is also problematic. Temperature probes without more don't indicate moisture. One hundred eighty degrees of moist heat can cause heat and moisture penetration into food to bring the food to its final heated and moist condition more quickly. The same temperature of dry heat could cause hardening and spoilage of the food in a fraction of the time.

Application of heat is another problem. Where a pan is heated, no benefit is had unless it is certain that water is present, and unless it is certain that the humidity reaches the other areas of the cabinet. Where a dry heating element is energized, the amount of heat leaving the element before shut off depends upon the moisture, and therefore total heat capacity of the volume of air in the unit of equipment. Thus, temperature alone will not give an indication of how much thermal energy has been introduced. Humidity alone will not give an indication of how much thermal energy has been introduced, and neither will it enable a projection based upon usage of the equipment for quick additional moisture and thermal input.

Another problem with conventional equipment configuration is the vented cabinet. Where a vent is provided, the cabinet continuously emits a mixture of moisture and air representing losses in energy due to the raised temperature of the exiting components compared to ambient temperature, and the energy which must be added to to vaporize water to replace the humidity lost from the vent. Vented systems also have a physical limitation as to where they can be placed to insure that the vented exit does not cause condensation on other equipment or walls, and that the condensation exit is not blocked as it would upset the steady state temperature and moisture movements within the unit, and likely cause the food to become water laden or soggy.

SUMMARY OF THE INVENTION

The thermal environment equipment and process of the present invention is illustrated through structures and processes described with respect to a single and double sided ventless humidity cabinet, and which may also optionally be a doorless humidity cabinet especially if access occurs often enough such that operating a door would be an efficiency distraction, and is a working assembly made up of a number of component parts. The components for full illustration number sixteen, and include: cabinet box (housing), wet heating element(s) or wet heat source, water temperature probe, inlet valve, drain valve, level sensor(s), water, water level, Dry heating element(s) or dry heat source, upper temperature probe or upper humidity probe(s), middle temperature probe(s) or middle humidity probe(s), lower temperature probe(s) or lower humidity probe(s), air curtain fan(s) both to isolate the warm moist air inside from the dry cooler air outside, and to provide internal circulation to the internal environment more even, doorless entry window(s), arrows showing laminar air flow direction forming air curtain and then mixing steam with dry heat, and a special customizable wall that is normally only included in double sided unit.

The cabinet box for the ventless system is preferably made of a rigid material such as metal or plastic and should be capable of safely holding hot water and steam with minimum ambient thermal loss through the cabinet walls. The ventless steam cabinet shape most commonly is box shape; however, for design efficiency or visual savvy can be any shape or size as long as it can hold its humidity and perform the function of producing steamy humid environment for the products contained within. Ventless indicates that there is no deliberate vent for vapor and hot air, and that any escape of heated vapor air mixture is with the removal of food, or through leakage from the doorless opening, mitigated by the air door or air guarding flow at the service opening.

The inlet valve allows for the water to flow into the cabinet box and can be manually or electronically controlled. The level sensor(s) is a device or devices that establish when the correct water level, the optimum amount of water in the unit, has been reached. The level sensor is also a device that detects where the water is in the system. If the water level is too low or too high, it will detect it, take an action, and could also generate error signals for other problems with the water level. The level sensor can range from a simple float to a remote sonic, infrared, heat, electric, electronic, or other means of establishing the water level. The water is heated with the wet heating element(s) or wet heat source which can be water immersible electric heating elements, gas heat, microwave, electronic, light, or other kind of heat generating method or source. The water temperature probe detects the temperature of the water. The water temperature probe can be a simple thermistor to an infrared, electronic, or other means for attaining water temperature. The drain valve allows for the water to flow out of the cabinet box and can be manually or electronically controlled. The steam from the water in the cabinet box provides a portion of the heat and most of the humidity.

The dry heating element(s) or dry heat source which can be air electric heating elements, gas heat, microwave, electronic, or other kind of heat generating method or source and is used to dry out air and generate heat or dry hot air for the cabinet. The dry heating element(s) or dry heat source is most often placed at the top of the cabinet; however, this does not have to be the case and other methods of injecting dry heated air into the cabinet box could be used.

The upper temperature probe(s) or upper humidity probe(s), middle temperature probe(s) or middle humidity probe(s), and lower temperature probe(s) or lower humidity probe(s) detects the amount of humidity, dry heat, and temperature generated and how well the dry air and wet steam are mixing. The upper temperature probe(s) or upper humidity probe(s), middle temperature probe(s) or middle humidity probe(s), and lower temperature probe(s) or lower humidity probe(s) can be a simple thermistor, humidity sensor to an infrared, electronic, or other means for attaining humidity and temperature. The upper temperature probe(s) or upper humidity probe(s), middle temperature probe(s) or middle humidity probe(s), and lower temperature probe(s) or lower humidity probe(s) represent three general zones for measurement, although less or more may be utilized, the three being: lower, middle, and upper.

For Example, with a tall cabinet of over five feet, it may be desirable to utilize more zones. However, it would be possible to use one of the probe locations creating one zone instead of three for creating less cost and simplicity with a decrement in accuracy. This is especially true for smaller units of equipment. The reverse would also be true in having more probes placed inside the cabinet adding to the cost and greatly increasing accuracy. Some units of equipment are equipped with doorless entry window(s) are/is the window through which you can grab the products inside through without having to open a door. By not having a door to open speed of service is greatly increased, and a lesser perturbation on the conditions within the equipment are created.

On a single sided ventless humidity cabinet, the ventless entry window is typically only on one side of the line. On a double sided ventless humidity cabinet there are typically two doorless entry windows, one for each side so that workers can withdraw food on both sides of a serving line pulling from the cabinet at the same time. An optional door may be used where access will not occur for some time, and to more efficiently enable the internals of the cabinet to churn with air flow and better accomplish moisture and thermal mixing.

In the double sided ventless humidity cabinet there may preferably be a customizable wall in the cabinet box to prevent airflow from occurring into one side by its doorless entry window and out the other by its doorless entry window should they both be operated at the same time. The custom wall can include small holed areas and doors to move products from one side of the cabinet to the other with ease. In the majority of the cases you need a customizable wall in the cabinet box to prevent airflow in one side and out the other. However, it would be possible that in some locations which do not have large air movement and pressure differentials to operate with removal of the wall completely.

BRIEF DESCRIPTION OF THE DRAWINGS

The invention, its configuration, construction, and operation will be best further described in the following detailed description, taken in conjunction with the accompanying drawings in which:

FIG. 1 is a three dimensional idealized layout for a single sided ventless humidity cabinet; and FIG. 2 is a three dimensional idealized layout for a double sided ventless humidity cabinet layout.

DETAILED DESCRIPTION OF THE PREFERRED EMBODIMENT

Referring to FIG. 1, a perspective view of a single sided ventless humidity cabinet 101. The cabinet 101 has side walls 103 and 105, a top wall 107 and a bottom wall 109. A doorless entry opening or window 111 is located on a front wall 115 and is located opposite a solid back wall 117. The use of the term "doorless entry window" indicates an opening which in rapid use is not expected to have a door to be opened and closed each time food is to be placed within or withdrawn from the cabinet 101. This does not mean that the cabinet 101 may not have a door for closure. However, any door it has should be configured to be out of the way during high usage periods and the cabinet 101 should be designed to work properly during such high usage periods. Such a door becomes a "temporary closure" door during useage hours, and preferably will function as an isolation cover during long periods of non-use. The term window applies to the Figures only if a covering structure is present, and when a covering structure is absent, it is an opening.

Within the cabinet 101 is an air curtain fan 121 which is shown as moving air along the inside of the rear of the doorless entry window 111. This wall of air helps to prevent mass migration of moist air from flowing into or leaving the inside of the cabinet 101. A water containment portion of the housing or cabinet 101 is seen as tank 125 is seen in the bottom of the cabinet 101 as an optionally separate structure. The bottom of the cabinet 101 can be formed as a water tank portion, but a separate structure may facilitate servicing, maintenance and inspection, etc. The water tank 125 will be used to create additions to water vapor content in the air typically by heating the tank of water to create increased water vapor pressure and to input heat of vaporization for molecules of the water enter the air as humidity. It is understood that other devices for producing humidity can be used including electrostatic discharge and atomization, etc. The illustration of a tank with a heat source introduces but one method to create such humidity.

In any event a tank structure or tank 125 has associated with it an inlet line 127 having an inlet valve 129. Either inside or below the tank 125 is shown to be a wet heating element 131 which is shown entering the cabinet 101 and forming a loop at the bottom of tank 125. The liquid level of water within the tank 125 may also have associated with it a water temperature probe 133, a level sensor 135, and a lower drain 137 controlled by a lower drain valve 139, as well as an upper overflow drain 141.

Supported in a position to have sensing contact with the air and humid air space above the tank 125, and of differing elevations at the side wall 103 is a lower probe set 151 which may be a temperature or humidity probe or both, a middle probe set 153 which may be a temperature or humidity probe or both, and an upper probe set 155 which may be a temperature or humidity probe or both.

A dry heating element 157 which is shown underneath the top wall 107 of and entering the cabinet 101 and forming a loop at the upper region of the cabinet 101 is shown. The dry heating element 157 can be located anywhere within the cabinet 101, but is shown located at the top to emphasize the driving force differences between the dry and wet heat.

All of the components which provide sensing or control may be tied into a computer 161, including inlet valve 129, wet heating element 131, water temperature probe 133, level sensor 135, lower drain valve 139, lower probe set 151, middle probe set 153, upper probe set 155 and dry heating element 157. Programming of the computer 161 can be effected to measure the energy input into the system, measure the balance of wet and dry heat input, measure the humidity, measure the temperature, measure the fresh water input and either or both the input water temperature, water tank 125 temperature and doorless entry window 111 activation.

Control parameter output of the computer 161 can be speed and inlet selection of air for the air curtain fan 121, inlet flow and time for operation of inlet valve 129, energization time and input energy level for energization time and input energy level for dry heating element 157, flushing rate and time for lower drain 137 by control of lower drain valve 139, and wet heating element 131 both during normal operation and in response to filling by operation of inlet valve 129.

The air curtain fan 121 blows outside air across the doorless entry window 111 creating a wall of air and trapping the hotter, more humid air inside the cabinet 101. The air curtain fan 121 is usually used to circulate a portion of the air inside the cabinet 101 and removes the necessity for an independent circulation fan. The arrows of FIG. 1 show generally laminar air flow in a direction forming an air curtain. As the air within the cabinet 101 continues to circulate past the doorless entry window, and within the cabinet generally, it then continues mixing steam or hot water vapor with dry heat in a continually mixing pattern. The mixing pattern is generally consistent with the air flow pattern shown. In most instances the air curtain fan 121 is enough to provide all of the circulation needs; however, an independent fan inside the cabinet to circulate and mix the air can be employed, especially if the air curtain fan 121 is no sufficiently strong.

The air curtain fan 121 usually draws the air from the cold outside air so the operators when they insert their hand are buffered by the cold air wall and is an inexpensive method. In some operations it may be necessary to draw the air from a heated source. The air curtain fan 121 is usually mounted on the bottom of the cabinet, however, for design efficiency or visual savvy it may be mounted remotely blowing air in the needed direction to form an air curtain. The air curtain fan usually blows from bottom to top, however, for design efficiency or visual savvy it can blow the air top to bottom, right to left, left to right, or bottom to top.

Referring to FIG. 2, a three dimensional idealized layout for a double sided ventless humidity cabinet 201 is seen. In general, the main elements of the cabinet 201 are the same as the elements of cabinet 201, with some additions and strategic placement of elements seen in cabinet 101.

The cabinet 201 has side walls 203 and 205, a top wall 207 and a bottom wall 209. A front doorless entry window 211 is located on a front wall 213 and a rear doorless entry window 215 is located opposite and on a back wall 217.

Within the cabinet 201 is a front air curtain fan 221 which is shown as moving air along the inside of the rear of the doorless entry window 211 and a second rear air curtain fan 223 which is shown as moving air along the inside of the doorless entry window 215. These twp walls of air help to prevent mass migration of moist air from flowing into or leaving the inside of the cabinet 201. A water tank 225 is seen in the bottom of the cabinet 201 as an optionally separate structure, but common to both halves of the cabinet 201.

In any event a tank structure or tank 225 has associated with it an inlet line 227 having an inlet valve 229. Either inside or below the tank 225 is shown to be a common wet heating element 231 which is shown entering the cabinet 201 and forming a loop at the bottom of tank 225. The liquid level of water within the tank 225 may also have associated with it a water temperature probe 233, a level sensor 235, and a lower drain 237 controlled by a lower drain valve 239, as well as an upper overflow drain 241. All these elements are commonly associated with the tank 225.

Supported in a position to have sensing contact with the air and humid air space above the tank 225, and of differing elevations at the side wall 203 is a lower probe set 251 which may be a temperature or humidity probe or both, a middle probe set 253 which may be a temperature or humidity probe or both, and an upper probe set 255 which may be a temperature or humidity probe or both. A dry heating element 257 which is shown underneath the top wall 207 of and entering the cabinet 201 and forming a loop at the upper region of the cabinet 201 is shown. The probe sets 251, 253, and 255 are placed along a common optional divider wall 259 which can be used to completely segregate the flow patterns of the internal air flow. In this geometry, the probe sets 251, 253, and 255 can measure an average of the temperatures (if applicable), humidities, (if applicable) or both (if applicable) on either side of the wall 259. Where some bleeding over can occur, the probe sets 251, 253, and 255 are in essence measuring an average set of values. In some instances the wall 259 may be eliminated in its use entirely. In other instances, the wall 259 may be fitted with apertures 260 to enable selected communication between first and second portions formed by the subdividing presence of the wall 259.

All of the components which provide sensing or control may be tied into a computer 261, including inlet valve 229, wet heating element 231, water temperature probe 233, level sensor 235, lower drain valve 239, lower probe set 251, middle probe set 253, upper probe set 255 and dry heating element 257. Programming of the computer 261 can be effected to measure the energy input into the system, measure the balance of wet and dry heat input, measure the humidity, measure the temperature, measure the fresh water input and either or both the input water temperature, water tank 225 temperature and doorless entry windows 211 and 215 activation.

Control parameter output of the computer 261 can be speed, differential speed, inlet selection and differential inlet selection of air for the air curtain fans 221 and 223, inlet flow and time for operation of inlet valve 229, energization time and input energy level for energization time and input energy level for dry heating element 257, flushing rate and time for lower drain 237 by control of lower drain valve 239, and wet heating element 231 both during normal operation and in response to filling by operation of inlet valve 229. Differential control of the air curtain fans 221 and 223, can, where probes are advantageously placed, control the flow of moist air to the side needing it most, particularly where wall 259 may be partially open.

The inventions and structures of FIGS. 1 and 2 illustrate a structure and method for heating up water and air in order that products may be held at a settable humidity and temperature inside a cabinet without a door for easy access. The structure and method for heating up water and air in order that products may be held at a settable humidity and temperature inside a cabinet 101, 201 without a door for easy access is an assembly as has been shown to include a structure and method for containing the water system, a structure and method for holding water and steam, a structure and method for heating the water and making steam or water vapor, a structure and method for measuring temperature, a structure and method for adding water, a structure and method for removing water, a structure and method for sensing water, a structure and method for controlling water level, a structure and method for containing the cabinet system, a structure and method for distributing the steam to the correct location, a structure and method for drying and heating air, a structure and method for sensing humidity and/or temperature in the upper part of the unit, a structure and method for sensing humidity and/or temperature is the middle part of the unit, a structure and method for sensing humidity and/or temperature in the lower part of the unit, a structure and method for creating air flow across the entry area or areas creating an air door, a structure and method for creating air flow inside the cabinet for circulation and the mixing of dry heat with steam, and a customizable wall in the double sided unit to prevent air travel in one opening and out the other when there are pressure differentials between sides.

The structure and method for containing the water system should be made of a material that can hold the weight of water, steam, hot air, and devices for the life of the unit. It can vary in size and shape as long as it can perform the function of heating water and turning a portion of it into steam. The structure and method for holding water should allow for a water tight compartment that can hold hot water and steam for long periods of time or indefinitely. The structure and method for adding water is simply having the ability to add water to the holding/heating area when needed. The structure and method for removing water is simply having the ability to remove water from the holding/heating area when needed. The structure and method for sensing water is simply the ability for the unit to sense where the water is in the system. The structure and method for controlling water level is a device or method that can raise and lower the water level in the system. The structure and method for heating the water, which is also shown as element 131, 231, and making steam is a method of heating up the water, which can be done with electric element, gas, microwave, heat exchanger, or any other structure and method of heating available. The structure and method for measuring temperature is simply using a device to detect what the temperature of the water is so it can be regulated. A structure and method for containing a cabinet 101, 201 system is usually a box or oval-like container that can hold products or items inside and has one or more openings with which to remove the items stored inside while at the same time holding the unique atmosphere inside with respect to temperature and humidity. A structure and method for drying and heating up air can be done with electric elements, gas, microwave, heat exchanger, or any other structure and method of heating available.

A structure and method for sensing humidity and/or temperature, using selected ones of the probe sets 151, 153, 155, 251, 253, or 255, in the upper part of the unit or cabinet 101, 201 provides a way to measure or approximate/estimate through a remote sensor or run time data, especially computer 161, 261, what the humidity and/or temperature is in the upper part of the cabinet 101, 201. A structure and method for sensing humidity and/or temperature in the middle part of the unit or cabinet 101, 201 using the probe sets 151, 153, 155, 251, 253, or 255 is a way to measure or approximate/estimate through remote sensor or run time data what the humidity and/or temperature is in the middle part of the cabinet. A structure and method for sensing humidity and/or temperature in the lower part of unit, as in probe sets 151, 153, 155, 251, 253, or 255, is a way to measure or approximate/estimate through a remote sensor or run time data what the humidity and/or temperature is in the lower part of the cabinet. The upper, middle and lower probe sets 151, 153, 155, 251, 253, or 255 can be combined into one probe set to reduce cost and decrease accuracy and the reverse can also take place where the cabinet can be divided into numerous parts that increase accuracy and price. A structure and method for creating air flow across the entry area or areas creating an air door is a structure and method of blowing air across the front of the entry area in order to keep the inside environment inside the cabinet 101, 201, contained. A structure and method for creating air flow inside the cabinet 101, 202 for circulation and the mixing of dry heat with steam is simply creating a mixing air flow inside the cabinet to balance out the humidity and temperature throughout the cabinet. It can be done in some instances with just the air flow from the structure and method of blowing air across the front of the entry area, such as at entry window 111, 211; however, in other instances additional air moving technology would need to be employed for additional circulation. A customizable wall 259 in the double sided unit to prevent air travel in one opening and out the other when there are pressure differentials between sides is usually needed when there is the possibility of air flow in one opening and out the other. In conditions where air does not travel in one opening and out the other, the customizable wall in the double sided unit can be removed. The wall 259 can be solid or it can have holes in different areas to allow for certain types of air flow between the two areas.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A ventless environmental system comprising:
   a cabinet housing having an entry window;
   an air curtain output adjacent said entry window for moving air generally parallel to said entry window;
   a first source of vaporizing moisture within said cabinet housing;
   a plurality of at least one of a sensor for measuring at least one of humidity and a sensor for measuring temperature within said and housing, located at least two heights within said housing;
   a first source of dry heat within said cabinet housing, said air curtain for moving air within said cabinet housing to expose said air to both said first source of vaporizing moisture and said first source of dry heat; and
   a controller for controlling at least one of said first source of dry heat, said first source of vaporizing moisture, and said air curtain output in response to said at least one sensor.

2. The ventless environmental system as recited in claim 1 and wherein said first source of vaporizing moisture within said cabinet housing further comprises:
   a water containment structure within said housing; and
   a source of heat directed to heat water contained within said water containment structure.

3. The ventless environmental system as recited in claim 2 and further comprising a source of fill controlled by a fill valve and a source of drainage controlled by a drainage valve, both said fill valve and said drainage valve controllably connected to and controlled by said controller.

4. The ventless environmental system as recited in claim 1 wherein said air curtain output is also for creating air flow inside said housing for exposure of said air into across said upper surface of liquid of said reservoir of vaporizing moisture and first source of dry heat within said cabinet housing.

5. A ventless environmental system comprising:
   a cabinet housing having a first access opening and a second access opening;
   a first air curtain output associated with said first access opening and a second air curtain output associated with said second access opening for moving air generally parallel to its associated said first and said second access openings;
   a first source of vaporizing moisture within said cabinet housing;
   at least a plurality of at least one sensor for measuring at least one of humidity and temperature within said housing, said plurality of at least one sensor located at least two heights within said housing;
   a first source of dry heat within said cabinet housing, at least one of said first and second air curtains for moving air within said cabinet housing to expose said air to both said first source of vaporizing moisture and said first source of dry heat; and
   a controller for controlling at least one of said first source of dry heat, said first source of vaporizing moisture, and said air curtain output in response to said at least one sensor.

6. The ventless environmental system as recited in claim 5 and wherein said first source of vaporizing moisture within said cabinet housing further comprises:
   a water containment structure within said housing; and
   a source of heat directed to heat water contained within said water containment structure.

7. The ventless environmental system as recited in claim 6 and further comprising a source of fill controlled by a fill valve and a source of drainage controlled by a drainage valve, both said fill valve and said drainage valve controllably connected to and controlled by said controller.

8. The ventless environmental system as recited in claim 5 wherein said at least one of said first and said second air curtain output is also for creating air flow inside said housing for exposure of said air into across said upper surface of liquid of said reservoir of vaporizing moisture circulation and mixing of the first source of vaporizing moisture and first source of dry heat within said cabinet housing.

9. The ventless environmental system as recited in claim 5 wherein said first and second access openings are openable and closeable entry windows located on opposite sides of said housing.

10. A ventless environmental system comprising:
   a cabinet housing having a first access opening and a second access opening;
   a first air curtain output associated with said first access opening and a second air curtain output associated with said second access opening for moving air generally parallel to its associated said first and said second access openings;
   a first source of vaporizing moisture within said cabinet housing;
   at least one sensor for measuring at least one of humidity and temperature within said and housing;
   a first source of dry heat within said cabinet housing, at least one of said first and said second air curtains for moving air within said cabinet housing to expose said air to both said first source of vaporizing moisture and said first source of dry heat;
   a controller for controlling at least one of said first source of dry heat, said first source of vaporizing moisture, and said air curtain output in response to said at least one sensor; and
   a divider wall at least partially dividing said housing into a first portion associated with said first access opening and a second portion associated with said second access opening.

11. The ventless environmental system as recited in claim 10 and further comprising a plurality of said at least one sensors within said housing, located along said divider wall within said housing and enabled to measure conditions in both said first and said second portions.

12. The ventless environmental system as recited in claim 10 and wherein said divider wall includes a plurality of strategically placed apertures to enable selected communication ween said first and said second portions.

* * * * *